United States Patent [19]

Gilmore et al.

[11] 3,935,325

[45] Jan. 27, 1976

[54] FREEZE-THAW STABLE LIQUID COFFEE WHITENER

[75] Inventors: Cecilia Gilmore; Donald E. Miller, both of Strongsville, Ohio

[73] Assignee: SCM Corporation, Cleveland, Ohio

[22] Filed: June 14, 1974

[21] Appl. No.: 479,684

Related U.S. Application Data

[63] Continuation-in-part of Ser. No. 284,127, Aug. 28, 1972, abandoned.

[52] U.S. Cl. ............. 426/613; 426/585; 426/656; 426/658
[51] Int. Cl.² .................................... A23D 5/00
[58] Field of Search .......... 426/116, 163, 164, 189, 426/194, 199, 201, 250, 588, 604, 648, 656, 613, 330.6, 585, 658

[56] References Cited
UNITED STATES PATENTS

| 3,350,209 | 10/1967 | Rodgers | 426/163 |
| 3,366,494 | 1/1968 | Bower et al. | 426/116 |
| 3,695,889 | 10/1972 | Ingerson | 426/201 X |

Primary Examiner—A. Louis Monacell
Assistant Examiner—R. A. Yoncoskie
Attorney, Agent, or Firm—Merton H. Douthitt; S. I. Khayat

[57] ABSTRACT

There is disclosed a pareve liquid coffee whitener characterized by having freeze-thaw stability, which comprises an aqueous emulsion of vegetable fat, vegetable protein, carbohydrates, and emulsifiers therefor, said emulsifiers consisting essentially of monoglycerides, partial fatty acid esters of hexitol, ethoxylated partial fatty acid esters of hexitol, and stearoyl-2-lactylic acid.

2 Claims, No Drawings

FREEZE-THAW STABLE LIQUID COFFEE WHITENER

CROSS-REFERENCE TO RELATED APPLICATIONS

The present application is a continuation-in-part to our co-pending patent application, Ser. No. 284,127 filed Aug. 28, 1972 and now abandoned, all of which is incorporated herein by reference.

BACKGROUND OF THE INVENTION

Coffee whiteners have been traditionally of the liquid or powdered type. In recent years coffee whiteners in the frozen state have been marketed with some success, particularly in view of the public acceptance accorded to frozen foods for their convenience in handling and storage.

An especially serious problem has been the tendency of frozen coffee whiteners to separate or destabilize on thawing and refreezing. This phase separation or emulsion breakdown was most noticeable with pareve compositions, i.e., those employing ingredients of non-animal source such as all vegetable fats and proteins. Often, directions on pareve frozen coffee whiteners instructed the user to thaw the contents and shake well prior to use. On the first freeze-thaw cycle the emulsion breakdown was generally not total and vigorous shaking could be sufficient to effect dispersion or suspension and thus minimize the phase separation. On refreeze and rethaw, however, shaking in most any form was not sufficient to stabilize the emulsion for any reasonable period of time, thereby rendering the use of such liquid coffee whitener undesirable. Thus freeze-thaw stability would appear to be a very significant property. An inherent property of such coffee whitener compositions is the ability to whiten the dark coffee. A less noticeable problem is insufficient whitening property which could be due to minor emulsion phase breakdown.

BRIEF STATEMENT OF THE INVENTION

Now, we have found a liquid pareve coffee whitener composition which is characterized by being stable to phase breakdowns on repeated freeze-thaw cycles, as well as the ability to maintain its whiteness. The coffee whitener of the present invention is normally an aqueous emulsion of vegetable fat, vegetable protein, carbohydrate, a stabilizer and an emulsifier comprising a monoglyceride, a partial fatty acid ester of hexitol, an ethoxylated partial fatty acid ester of hexitol and stearoyl-2-lactylic acid. Significantly, we have found that salts of stearoyl-2-lactylic acid are not as effective as the acid itself.

DETAILED DESCRIPTION OF THE INVENTION

As indicated earlier, the pareve coffee whitener of the present invention is made all of non-animal ingredients. The freeze-thaw stability and whiteness are believed to be attributed to the emulsifier components described in detail herein. These are (a) monoglyceride, (b) a partial fatty acid ester of hexitol, (c) an ethoxylated partial fatty acid ester of hexitol, and (d) stearoyl-2-lactylic acid. The amounts for these different emulsifier components are varied within the following ranges:

a. Monoglycerides from 0.3 to 0.6% by weight based on the total weight of the whitener's composition. By monoglycerides we mean the partial fatty acid esters of glycerol, including the diglycerides. Of importance, is the fact that the term monoglycerides referred to in commerce does not denote pure monoglycerides. Generally, commercial grades of monoglycerides contain about 40 to 45% by weight of α-monoglycerides with the remainder being diglycerides (40–45%), triglycerides and unreacted glycerol. Nevertheless, for the coffee whitener of the present invention the α-monoglycerides should not be below 40% by weight. Of course, distilled monoglycerides containing a minimum of 90% by weight α-monoglycerides can be used with advantage. The fatty acid component of the monoglyceride can have from 14 to 18 carbon atoms. Of the fatty acids in this range, stearic acid is preferred.

b. The partial fatty acid ester of hexitol can be utilized from about 0.05% to about 0.2% by weight. Hexitol refers primarily to sorbitol or mannitol with the former being preferred for efficiency and economy. A typical ester is sorbitan monostearate.

c. As to the ethoxylated esters of hexitol, they comprise the condensation reaction product of the partial fatty acid ester with ethylene oxide or the esterified product of ethoxylated hexitol. The extent of ethoxylation can range from the equivalent of 4 to 5 ethylene oxide units up to 80–100 units. Preferably, the hexitol is sorbitol and the amount of ethylene oxide condensed therewith is an average of 20 units. The fatty acid component can have from 14 to 18 carbon atoms, but typified with stearic acid. Thus, a preferred ethoxylated ester of hexitol is ethoxylated sorbitan monostearate. Commercially available products of these esters are known as "Durfax 60", a trademark of SCM Corporation, of "Tween", a trademark of Atlas Industries. One or more of these ethoxylated products can be utilized within the range of from about 0.1 to about 0.3% by weight, preferably about 0.2%.

d. The stearoyl-2-lactylic acid, also known as, Marvic Acid, a trademark of SCM Corporation, is used from about 0.05 to about 0.6% by weight, preferably in the range 0.2 to 0.4% by weight.

At this juncture, it should be noted that the salts (alkali metal or alkaline earth metal salts) of Marvic Acid have not shown to be as effective as the acid itself. Experiments have shown that pareve coffee whiteners formulated with Marvic Acid were more stable, as far as freeze-thaw stability, than those formulated with Marvic Acid salts, such as calcium or sodium salts. Also, the presence of Marvic Acid appears to contribute to the whitening power of the whitener of the present invention.

Coffee whiteners, also, include other additives or adjuvants for the purpose of improving the viscosity, body, dispersibility, or other properties of the particular coffee whitener. Of note are the various thickening agents or gums, the various stabilizing salts as well as known preservatives. Typical gums include, but not limited to, locust been gum, guar gum, algin, carageenan, xanthan, and the like, bean can be used in proportions ranging from about 0.01 to about 3.0% by weight. Similarly, dispersing agents of the phosphate and hydrate types are used in about 0.1% by weight. Common stabilizing and/or buffering salts for this use are sodium citrate, dipotassium phosphate, tetra sodium pyrophosphate, and so forth.

A wide variety of coffee whitener formulations is known and can be used in conjunction with the emulsifiers of the present inventions. Generally, pareve coffee whiteners comprise emulsifiers, stabilizers, and thickeners, vegetable fat and vegetable proteins, as well as sweeteners (carbohydrates), flavorants, and colorants. These various components provide a considerable number of variations depending on the desired quality. For example, fat contents and sweetness can be altered within a wide range even though the tendency has been toward minimal amounts for reasons of economy and reduction in caloric content.

The proportion of vegetable fat used in preparing the coffee whitener can vary from about 5 to 18% by weight. It is usually present in a proportion of about 10%. The fat should have a low melting point and narrow plastic range as these provide for easy blending and dispersibility in hot coffee. Examples of fats for coffee whiteners are hydrogenated coconut and hydrogenated refined fractions of soybean oil. Hard butters such as those from coconut and soybean-cottenseed oil fractions are also adapted for making the coffee whitener.

The vegetable protein used in preparing pareve coffee whiteners should be present in a proportion of about 1 to 3% by weight. It serves to increase viscosity and whitening power and helps give desired body characteristics. The vegetable proteinate commonly used for pareve whiteners is soybean proteinate.

The carbohydrate used in the liquid coffee whitener is present in a proportion of about 5 to 15% by weight to act also as a bodying agent and to add some sweetness. It consists generally of corn syrup solids, or sucrose. Sometimes a mixture of the two are used together, but more often, it is preferred to use corn syrups as the carbohydrate.

The following examples are provided to illustrate the invention and how certain variations in the emulsifier components can be made. All parts and percentages are by weight unless otherwise specified.

EXAMPLE I

A pareve coffee whitener was prepared from the ingredients listed below with their respective amounts.

| Ingredient | % by weight |
| --- | --- |
| Vegetable fat ("Paramount C", a trademark of SCM Corporation) comprising re-arranged blends of hydrogenated palm kernel oil and coconut oil, with lecithin. | 10.0 |
| 36D Corn Syrup | 12.0 |
| Soybean proteinate isolate | 1.0 |
| Monoglyceride ("Dur-Em 117", a trademark of SCM Corporation) comprising a minimum of 40% by weight α-monoglyceride (glycerol monostearate) | 0.45 |
| Polyoxyethylene sorbitan monostearate ("Durfax 60", a trademark of SCM Corporation) | 0.10 |
| Sorbitan monostearate | 0.15 |
| Dipotassium phosphate (Stabilizing salt) | 0.30 |
| Marvic Acid (stearoyl-2-lactylate) | 0.20 |
| Water | 75.80 |
| | 100.00 |

First, the stabilizing salt, soybean proteinate, and corn syrup solids were added to a vessel containing the water and mixed to dissolve the solids. The resultant aqueous mixture is heated to 120°F. In another vessel, the "Paramount C" and the emulsifiers; i.e., monoglyceride, sorbitan monostearate, polyoxyethylene sorbitan monostearate, and Marvic Acid were melted and blended. This blend was added to the Vessel containing the aqueous mixture and the entire contents were mixed. After complete mixing and blending at 120°F., the contents then were pasteurized at a temperature of 160°F. for about 30 minutes. A highly unique feature is that the mix may also be pasteurized asceptically by processing it at ultra high temperatures such as 265°F. for 3 seconds. Then to completely emulsify the mix for forming a stable emulsion, the mix was passed through a two-stage homogenizer, the first step being operated at a pressure of about 2500 PSIG and the second at 500 PSIG. The second stage is used to break up any agglomerates formed in the first stage.

The above coffee whitener was frozen to −20°F. and then allowed to thaw to a temperature of 40°F. and observed for emulsion stability. The cycle is repeated for 5 times; (freezing at 0°F.). After the five freeze-thaw cycles, the emulsion on examination was stable by showing no separation or phase breakdown.

The emulsion stability was observed visually and by inserting a stainless spatula into the thawed whitener to examine the homogeneity and/or particulate matter which indicates a broken emulsion.

Of course, an essential property of the coffee whitener is to whiten coffee. To check the effectiveness of the whitener in this respect, the following test was devised and run on all preparations.

To 0.9 ounce of the whitener described above placed in a beaker, 6 ounces of coffee (1.65 grams of Chase and Sanborn Instant Coffee per 6 ounces of water) at about 190°F. were added. The whiteness of the coffee-whitener mixture was measured in an instrument called Agtron (Model M-400-A made by Magnuson Engineers of San Jose, California). The whitened coffee was poured into an Agtron cup (supplied with the instrument) up to ¾ full, and the cup was placed in the instrument reflectance colorimeter which had been standardized with the 07 and 44 discs using the green filter. The temperature and Agtron reading of the above whitened coffee were recorded to be 150°F. and 43.0, respectively.

The above whitener was put through 5 cycles of freeze-thaw, and its reflectance in coffee was measured after the first, second, and fifth cycles. These numbers were 43.0, 41.5, and 42.0, respectively, indicating excellent stability and maintained whitening property.

COMPARATIVE DATA

Five additional formulations of the whitener described in Example I were prepared wherein all the ingredients were the same except for Marvic Acid which varied as follows: 0.0%, 0.1%, 0.4%, 0.6%, and 0.8% (water content and buffer were changed slightly to compensate for the changes in Marvic Acid). Subjecting the foregoing formulations to freeze-thaw cycling and reflectance measurements resulted in that the samples containing 0.0%, 0.1%, 0.4%, and 0.6% showed stability as to emulsion breakdown, whereas the sample containing 0.8% broke down after one cycle. As to the reflectance data after first, second, and fifth cycles, the readings were as follows:

| % Marvic Acid | Agtron Readings | | |
| --- | --- | --- | --- |
| | First | Second | Fifth Cycles |
| 0 | 37.5 | 36.5 | 36.0 |
| 0.1 | 41.0 | 39.0 | 37.5 |
| 0.4 | 43.5 | 43.0 | 42.0 |

-continued

| % Marvic Acid | Agtron Readings | | |
|---|---|---|---|
| | First | Second | Fifth Cycles |
| 0.6 | 44.0 | 43.0 | 42.0 |
| 0.8 | 46.5 | — | — |

From the above, it can be seen that the Marvic Acid contributes significantly to the whitening property of the composition. For clarity, it should be noted that in the same series of reflectance readings difference of 5 units or more is considered significant.

The compositions containing 0.4 and 0.6% Marvic Acid showed a slight increase in viscosity.

EXAMPLE II

Comparative freeze-thaw stability tests were run on coffee whiteners prepared in a manner exactly the same as Example I, varying only the emulsifier used in preparing the coffee whitener. The level of emulsifier was essentially the same as the level of emulsifier in Example I. The table below represents the result of the freeze-thaw stability:

| COFFEE WHITENER | EMULSIFIERS PERCENT | FREEZE-THAW STABILITY |
|---|---|---|
| A | 0.48 Triglycerol monostearate<br>0.20 Stearoyl-2-Lactylic acid | 1 cycle - emulsion broke on second cycle |
| B | 0.48 Hexaglycerol monostearate<br>0.20 Stearoyl-2-lactylic acid | '' |
| C | 0.48 Decaglycerol decaoleate<br>0.20 Stearoyl-2-lactylic acid | '' |
| D | 0.48 Decaglycerol monostearate<br>0.20 Stearoyl-2-lactylic acid | '' |

The above results show that the coffee whiteners employing polyglycerol esters in combination with Marvic Acid, a trademark for stearoyl-2-lactylic acid, did not produce the emulsion stability that the four-compound emulsifier system as disclosed herein. Emulsion stability was acceptable for one freeze-thaw cycle only.

EXAMPLE III

A coffee whitener was made in accordance with the procedures of Example I using the ingredients set forth below:

| Ingredient | Percent |
|---|---|
| Water | 74.20 |
| "Paramount C" w/Lecithin ("Paramount C is palm kernel and coconut oil) | 12.00 |
| 36 D. E. Corn Syrup Solids | 10.00 |
| Supro 7 (Soybean Proteinate) | 0.90 |
| Sodium Citrate | 0.40 |
| Dipotassium Phosphate | 0.22 |
| Monopotassium Phosphate | 0.10 |
| Sugar | 1.00 |
| Carboxymethyl Cellulose | 0.10 |
| Glycerol Mono- and Distearate (40% α-monoglycerides) | 1.00 |
| Polyoxyethylene Sorbitan Monostearate | 0.08 |
| | 100.00 |

On testing the above whitener broke down after one cycle.

EXAMPLE IV

The formulation shown in Example III was changed to contain: 0.1% sorbitan monostearate, 0.2% polyethylene sorbitan monostearate, and the reduced amount of monoglycerides 0.5%, in addition to 0.2% Marvic Acid. The resultant whitener was excellent. It was stable for five freeze-thaw cycles and had reflectance readings between 41 and 42 which are quite acceptable.

What we claim is:

1. A pareve fluid coffee whitener characterized by enhanced freeze-thaw stability and improved whiteness, comprising 5–18% by weight of vegetable fat, 1–3% by weight of vegetable protein, 5–15% by weight of sweetener, emulsifiers, and water to make up 100%, said emulsifiers consisting essentially of:
   a. 0.3 to 0.6% by weight of said whitener of monoglycerides;
   b. 0.1 to 0.3% by weight of an ethoxylated partial fatty acid ester of a hexitol selected from mannitol and sorbitol;
   c. 0.05 to 0.2% by weight of a partial fatty acid ester of a hexitol selected from mannitol and sorbitol; and
   d. 0.05 to 0.6% by weight of stearoyl-2-lactylic acid.

2. The coffee whitener according to claim 1, wherein the ingredients are:

| | |
|---|---|
| vegetable fat | 10.0% |
| sweetener | 12.0% |
| vegetable protein | 1.0% |
| water | 75.8% |
| monoglycerides | 0.45% |
| polyoxyethylene sorbitan monostearate | 0.10% |
| sorbitan monostearate | 0.15% |
| dipotassium phosphate | 0.30% |
| stearoyl-2-lactylic acid | 0.20%. |

* * * * *